US012255510B2

(12) United States Patent
Huang et al.

(10) Patent No.: US 12,255,510 B2
(45) Date of Patent: Mar. 18, 2025

(54) MIXED-PHASE WINDING, STATOR, AND MOTOR

(71) Applicants: CHONGQING ZONGSHEN ELECTRIC POWER TECHNOLOGY CO. LTD, Chongqing (CN); CHONGQING ZONGSHEN INNOVATION TECHNOLOGY RESEARCH INSTITUTE CO. LTD, Chongqing (CN)

(72) Inventors: Chaodong Huang, Chongqing (CN); Junshan Shao, Chongqing (CN)

(73) Assignees: CHONGQING ZONGSHEN ELECTRIC POWER TECHNOLOGY CO. LTD, Chongqing (CN); CHONGQING ZONGSHEN INNOVATION TECHNOLOGY RESEARCH INSTITUTE CO. LTD, Chongqing (CN)

( * ) Notice: Subject to any disclaimer, the term of this patent is extended or adjusted under 35 U.S.C. 154(b) by 388 days.

(21) Appl. No.: 17/707,065

(22) Filed: Mar. 29, 2022

(65) Prior Publication Data
US 2022/0224181 A1    Jul. 14, 2022

Related U.S. Application Data

(63) Continuation of application No. PCT/CN2020/129570, filed on Nov. 17, 2020.

(30) Foreign Application Priority Data

Dec. 5, 2019   (CN) .......................... 201911236634.6

(51) Int. Cl.
*H02K 3/28*    (2006.01)
*H02K 1/16*    (2006.01)

(52) U.S. Cl.
CPC ................. *H02K 3/28* (2013.01); *H02K 1/16* (2013.01); *H02K 2213/03* (2013.01)

(58) Field of Classification Search
CPC .. H02K 3/28; H02K 3/30; H02K 3/32; H02K 3/02; H02K 3/04; H02K 3/12; H02K 1/16; H02K 1/17; H02K 1/18; H02K 1/165
See application file for complete search history.

(56) References Cited

U.S. PATENT DOCUMENTS

| 2003/0132680 A1* | 7/2003 | Nakamura | ............... H02K 3/28 310/180 |
| 2014/0001898 A1* | 1/2014 | Hattori | ..................... H02K 3/28 310/71 |

(Continued)

FOREIGN PATENT DOCUMENTS

| CN | 101490933 A | 7/2009 |
| CN | 110266134 A | 9/2019 |

(Continued)

OTHER PUBLICATIONS

International Search Report and Written Opinion issued in corresponding PCT Application No. PCT/CN2020/129570, dated Feb. 9, 2021.

*Primary Examiner* — Nguyen Tran
(74) *Attorney, Agent, or Firm* — Westbridge IP LLC

(57) ABSTRACT

Disclosed is a mixed-phase winding, comprising at least one branch, where each branch is composed of at least one coil ring; the coil ring comprises a set of lap winding coils and a set of combined conductors; each set of lap winding coils comprises P lap winding coils evenly distributed in the circumferential direction, and each set of combined conductors comprises P combined conductors evenly distributed in the circumferential direction, P being the number of pole pairs; and the lap winding coils and the combined conduc- (Continued)

tors are arranged at intervals in a staggered manner in the circumferential direction and sequentially connected in series; each lap winding coil and each combined conductor each comprises a hairpin conductor or at least two hairpin conductors arranged side by side in the thickness direction; each hairpin conductor comprises a hairpin body integrally bent in a U shape.

11 Claims, 15 Drawing Sheets

(56) References Cited

U.S. PATENT DOCUMENTS

2014/0111055 A1 4/2014 Chamberlin
2021/0296956 A1* 9/2021 Eilenberger ............. H02K 3/48

FOREIGN PATENT DOCUMENTS

| | | |
|---|---|---|
| CN | 110380547 A | 10/2019 |
| CN | 110417151 A | 11/2019 |
| CN | 110752693 A | 2/2020 |
| DE | 202018006090 U1 | 4/2019 |

* cited by examiner

MIXED-PHASE WINDING, STATOR, AND MOTOR

CROSS-REFERENCE TO RELATED APPLICATIONS

The present application is a continuation of International Application No. PCT/CN2020/129570, filed on Nov. 17, 2020, which claims priority to Chinese Patent Application No. 201911236634.6, filed on Dec. 5, 2019. The disclosures of the aforementioned applications are incorporated for reference.

TECHNICAL FIELD

The present application relates to the technical field of flat wire motors, and in particular to a mixed-phase winding, a stator and a motor.

BACKGROUND

A motor (including an electric motor and a generator) is a device that converts electrical energy into mechanical energy (or converts mechanical energy into electrical energy) according to the principle of electromagnetic induction, and can be used as a power source or a power generation device for various electrical appliances such as household appliances, various machinery such as electric vehicles and electrical cars. The motor can be classified into a direct current motor and an alternating current motor according to the type of a working power source supplied to the motor, and the alternating current motor can be further divided into a single-phase motor and a multi-phase motor (such as a three-phase motor, etc.). The motor includes a stator and a rotor, and a winding is provided in a stator iron core slot of the stator. The conventional winding is made of round wire by winding. Although the winding process is relatively simple, the space utilization in the iron core slot is low, the waste of useless copper at an end is large, and the power density is low, so the round wire is gradually replaced by a flat copper wire or a rectangular-section cooper wire.

At present, the winding of the flat copper wire or the rectangular-section cooper wire is mainly formed by connecting segmented hairpin conductors each of which as a whole is bent into a U-shape. A coil ring is mainly formed by P hairpin conductors which are evenly distributed in a circumferential direction of the stator iron core and are connected in series sequentially, where P is the number of pole pairs. The coil rings are stacked in the stator iron core slot. When one coil ring is connected to another coil ring which is provided in a staggered manner in the circumferential direction, a support leg part of the hairpin conductor at the tail of the former coil ring and a support leg part of the hairpin conductor at the tail of the latter coil ring need to be exchanged in position, facilitating the direct connection between a support foot of the support leg part of the hairpin conductor at the tail of the former coil ring and a support foot of the support leg part of the hairpin conductor at the head of the latter coil ring. However, since the hairpin conductors of the two coil rings are staggered with each other in position, the hairpin conductors which are connected to each other are also staggered with each other in position. After the positions of the support leg parts on the two coil rings are exchanged, a head part of the hairpin conductor at the tail of one coil ring is deformed or a span of the hairpin conductor is multiplied, which results in complex structure of the winding, difficult design and assembly and is unfavorable for production and manufacturing.

SUMMARY

In view of the disadvantages of the above conventional technology, the technical problems to be solved by the present application is how to provide a mixed-phase winding, a stator and a motor, which have simple structure, easy design, low assembly difficulty, and low production and manufacturing costs.

In order to solve the above technical problems, technical solutions are provided in the present application as follows.

A mixed-phase winding includes at least one branch, each branch includes at least one coil ring, the coil ring includes a set of lap winding coils and a set of combined conductors, each set of lap winding coils includes P lap winding coils evenly distributed in a circumferential direction, and each set of combined conductors includes P combined conductors evenly distributed in the circumferential direction, P is the number of pole pairs, and the lap winding coils and the combined conductors are spaced apart in a staggered manner in the circumferential direction and are connected in series sequentially; each of the lap winding coil and the combined conductor includes one hairpin conductor or at least two hairpin conductors arranged side by side in a thickness direction, the hairpin conductor includes a hairpin body which as a whole is bent into a U-shape, the hairpin body includes two support leg parts arranged in parallel and a head part connected to one end of the two support leg parts, and the two support leg parts are each provided with a support foot at another end.

Since the P lap winding coils of each coil ring are distributed between two adjacent combined conductors in the circumferential direction, and each of the lap winding coil and the combined conductor includes one hairpin conductor or at least two hairpin conductors arranged side by side in a thickness direction, that is, includes at least one hairpin conductor, so that when the two coil rings staggered with each other in the circumferential direction of the stator are connected to each other, the combined conductors of one coil ring and the lap winding coils of another coil ring are located at corresponding positions of each layer, that is, the two hairpin conductors respectively located on the two coil rings for connection are arranged radially side by side. In this way, if positions of corresponding support leg parts of the two hairpin conductors are exchanged, the head part of the hairpin conductor may not be deformed or the span of the hairpin conductor may not be multiplied, the connection of the two coil rings can be easily realized, the structure of the hairpin conductor is simpler, and the design is more convenient, which further reduces the difficulty of assembly and the cost of manufacturing. As an optimization, in each branch, the support leg parts, where support feet for connecting a power supply and a star point are located, are respectively located on an outermost layer and a secondly-outermost layer, or respectively located on the secondly-outermost layer and the outermost layer of respective slots, where the support leg parts are located, in an assembly state.

Generally, when a flat wire motor is in an assembly state, first, the hairpin body which is pre-bent into a regular U-shape is inserted from one end of the stator, and the support feet are passed through the stator, and then the support feet on the stator are bent layer by layer in the circumferential direction by a bending device, and then the support feet are cut, so that the hairpin conductors are finally formed. With the above structure, the support feet for connecting the power supply and the star point are arranged on the outermost layer and the secondly-outermost layer, or arranged on the secondly-outermost layer and the outermost layer, the support feet on the outermost layer for connecting the power supply or the star point may be bent outward first, so that the support feet on the corresponding secondly-outermost layer are in the outermost positions, which is convenient for a star point connecting conductor to be directly welded to the support foot for connecting the star point, and reduces the difficulty of welding.

As an optimization, each branch is formed by connecting two coil rings, one phase winding includes two sets of coil rings, each set of coil rings includes Q coil rings located in consecutive adjacent Q slots in the circumferential direction of the stator in the assembly state, and Q is the number of slots per pole and phase and is an integer greater than 1. In a clockwise or counterclockwise direction, a coil ring located in an Ath slot in one set of coil rings is connected in series with another coil ring located in a (Q+1−A)th slot in another set of coil rings to form a branch.

In this way, ring current formed between the multiple branches can be avoided, which can improve the efficiency of the motor.

As an optimization, the mixed-phase winding includes one branch, the branch includes two sets of coil rings connected in series, each set of coil rings includes Q coil rings located in consecutive adjacent Q slots in the circumferential direction of the stator in the assembly state, and Q is the number of slots per pole and phase and is an integer greater than 1; in a same set of coil rings, two coil rings located in adjacent slots are connected to each other, and a pitch of the hairpin conductor on a last single coil of a former coil ring in a clockwise or counterclockwise direction is Y+1, the support foot, located at an end of the hairpin conductor with the pitch of Y+1, and the support foot connected therewith of a latter coil ring are arranged side by side in a radial direction of the phase winding, and a pitch of the hairpin conductor on a last single coil of a last coil ring in the clockwise or counterclockwise direction is Y−Q+1, and a pitch of all other hairpin conductors is Y.

Furthermore, in the clockwise or counterclockwise direction, in the branch located in the Ath slot in the assembly state, in the two coil rings connected in series, a pitch of a last hairpin conductor on the former coil ring is Y+Q−2A+1, a pitch of a last hairpin conductor on the latter coil ring is Y−Q+2A−1, and a pitch of all other hairpin conductors is Y; or, in the clockwise or counterclockwise direction, in the branch located in the Ath slot in the assembly state, in the two coil rings connected in series, a pitch of a first hairpin conductor on the former coil ring is Y+Q−2A+1, a pitch of a first hairpin conductor on the latter coil ring is Y−Q+2A−1, and a pitch of all other hairpin conductors is Y.

In this way, the support foot of the last hairpin conductor on the former coil ring can be located close to the support foot connected therewith of the latter coil ring, so that the two support feet can be directly connected without using a jumper conductor, and the difficulty of assembly and welding is reduced.

As an optimization, each lap winding coil includes two hairpin conductors, which are first-type skewed U-shaped conductor and second-type skewed U-shaped conductor, the first-type skewed U-shaped conductor and the second-type skewed U-shaped conductor are arranged side by side in a thickness direction of the hairpin body, a support foot on one support leg part of the first-type skewed U-shaped conductor and a support foot on another support leg part of the second-type skewed U-shaped conductor are skewed and bent away from each other in the width direction of the hairpin body, and another two support feet of the first-type skewed U-shaped conductor and the second-type skewed U-shaped conductor are bent toward each other in the width direction of the hairpin body and are connected with each other to form the lap winding coil; the hairpin conductor of the combined conductor is an integrally annular O-shaped conductor, two support feet of the O-shaped conductor are skewed and bent toward a middle part in the width direction of the hairpin body, and are spaced apart in a staggered manner in the thickness direction of the hairpin body.

Furthermore, the lap winding coil may further include the O-shaped conductor, the O-shaped conductor and the second-type skewed U-shaped conductor are stacked in a thickness direction of the first-type skewed U-shaped conductor, and two support feet of the O-shaped conductor are respectively connected to other adjacent support feet in the thickness direction.

As an optimization, the hairpin conductor of the lap winding coil is an integrally annular O-shaped conductor, two support feet of the O-shaped conductor are skewed and bent toward the middle part in the width direction of the hairpin body, and are spaced apart in a staggered manner in the thickness direction of the hairpin body; the combined conductor includes one hairpin conductor, which is a wave-like conductor with two support feet skewed and bent away from each other in the width direction of the hairpin body.

Furthermore, support leg parts, where a pair of support feet connected to each other between the lap winding coil and the combined conductors are located, are respectively located in the secondly-outermost layer and the outermost layer, or located in the outermost layer and the secondly-outermost layer of respective slots during assembly.

As an optimization, at least one hairpin conductor in the branch is two single foot conductors correspondingly arranged at a position where the support leg parts of the hairpin conductor is located, one end of the single foot conductor is a support foot, and the support foot is consistent with the support foot of the hairpin conductor at the corresponding position, and another end of the single foot conductor is a connecting end.

A stator includes a stator iron core and multiple circuits of mixed-phase windings according to the above description mounted on the stator iron core, the connecting ends of multiple circuits of the mixed-phase windings for connecting the power supply are respectively connected with power supply terminals, and the connecting ends of multiple circuits of the mixed-phase windings for connecting the star point are welded by a star point connecting conductor.

A motor includes the above stator.

In summary, the present application has advantages of simple structure, easy design, low assembly difficulty, and low production and manufacturing costs.

DETAILED DESCRIPTION OF THE EMBODIMENTS

The specific implementations of the present application are described in further detail below in conjunction with embodiments.

Figure 1:
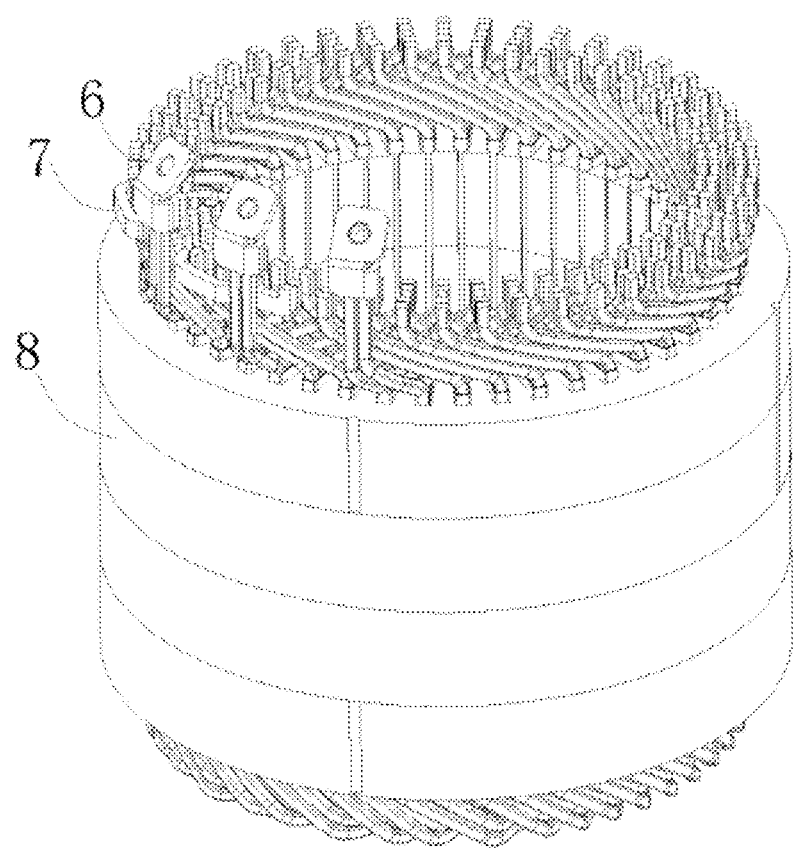
FIG. 1 is a schematic structural view of a stator in a first embodiment.
Figure 2:
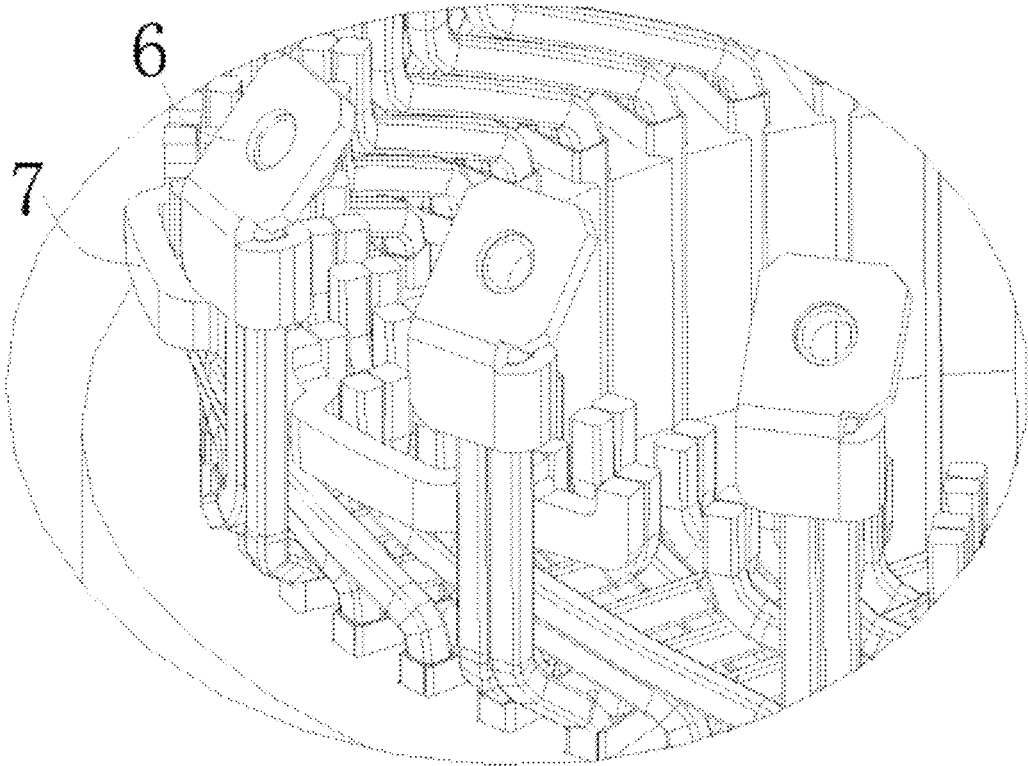
FIG. 2 is an enlarged schematic structural view at the circle in FIG. 1.
Figure 3:
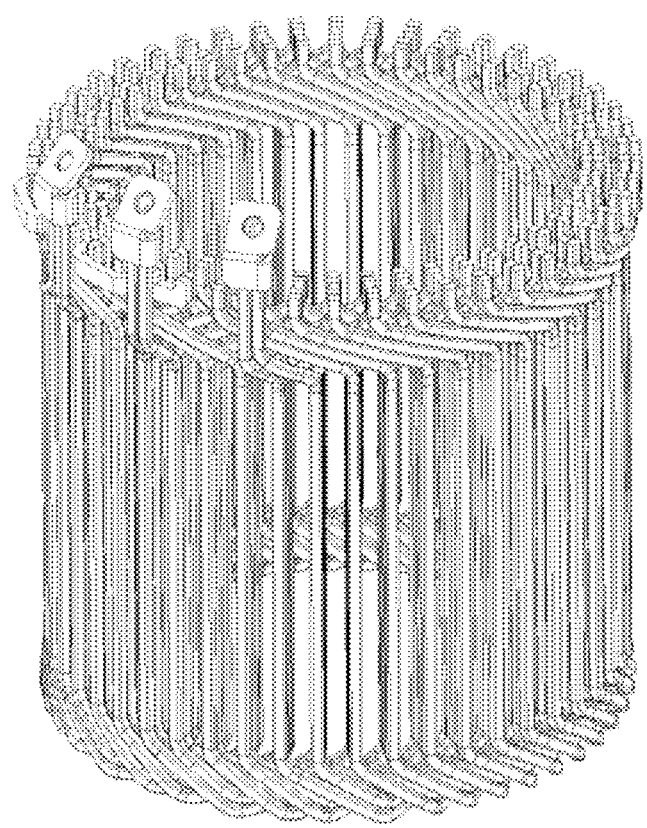
FIG. 3 is a schematic structural view of three phase windings in the first embodiment.

First embodiment: as shown in FIGS. 1 to 3, a motor includes a stator, the stator includes a stator iron core 8 and three circuits of phase windings mounted on the stator iron core 8, one end of each branch on phase windings is connected to each other by a star point connecting conductor 7, and another ends of two parallel branches on each phase winding are connected in parallel by a power supply lead-out conductor 6.

The stator iron core 8 includes an integrally cylindrical main body, multiple stator iron core slots opening radially inward are circumferentially defined in an inner ring of the stator iron core 8, and a lower end of each stator iron core slot is an insertion side (also called a coronal side), and an upper end of each stator iron core slot is a connection side.

Figure 4:
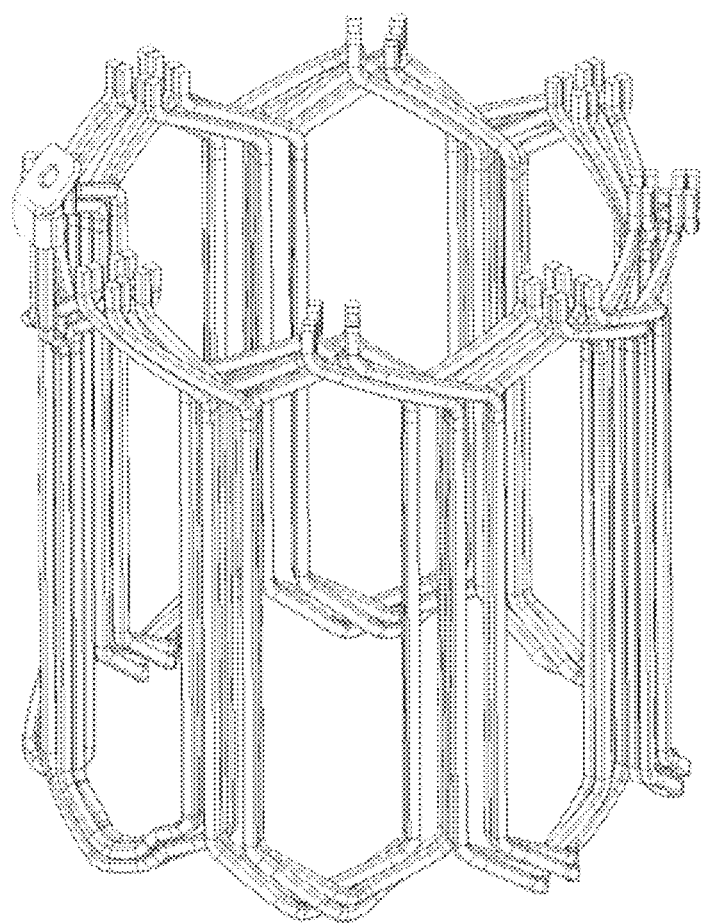
FIG. 4 is a schematic structural view of one phase winding in the first embodiment.
Figure 5:
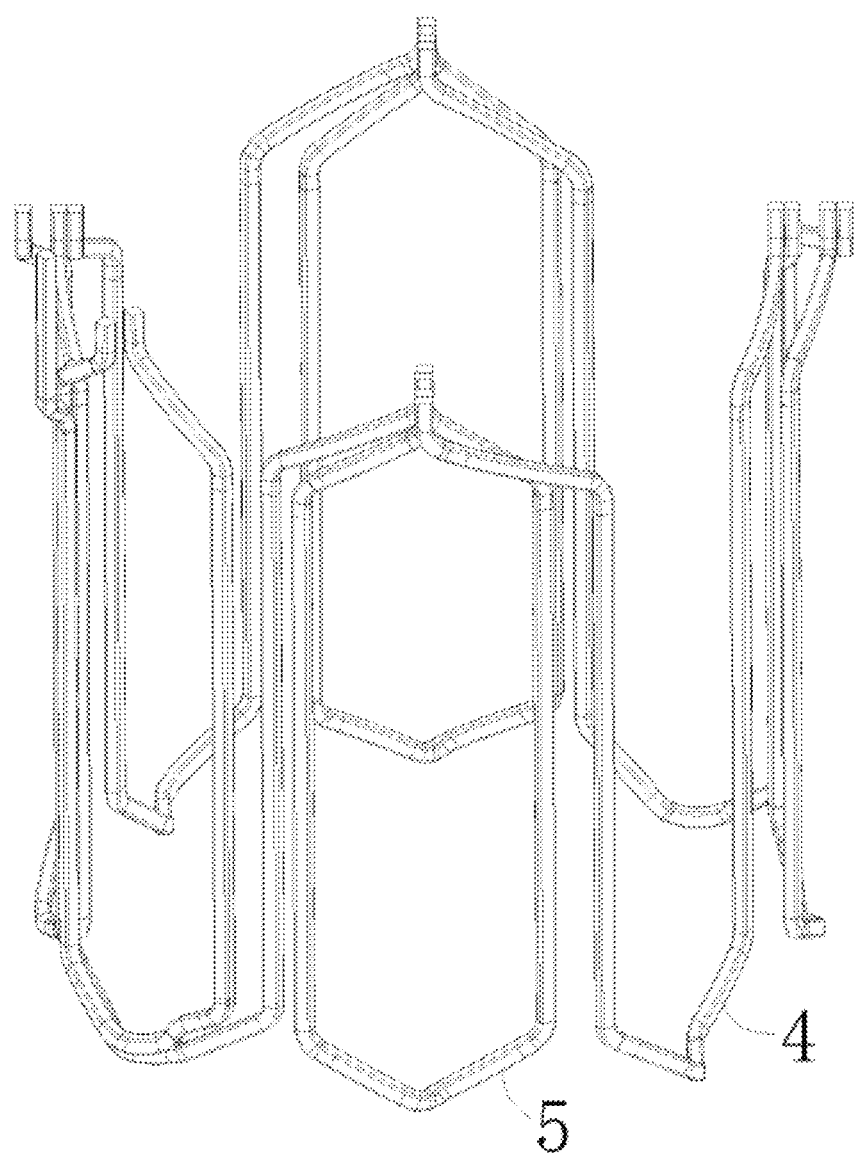
FIG. 5 and FIG. 6 are schematic structural views of coil rings in a branch in the first embodiment.
Figure 6:
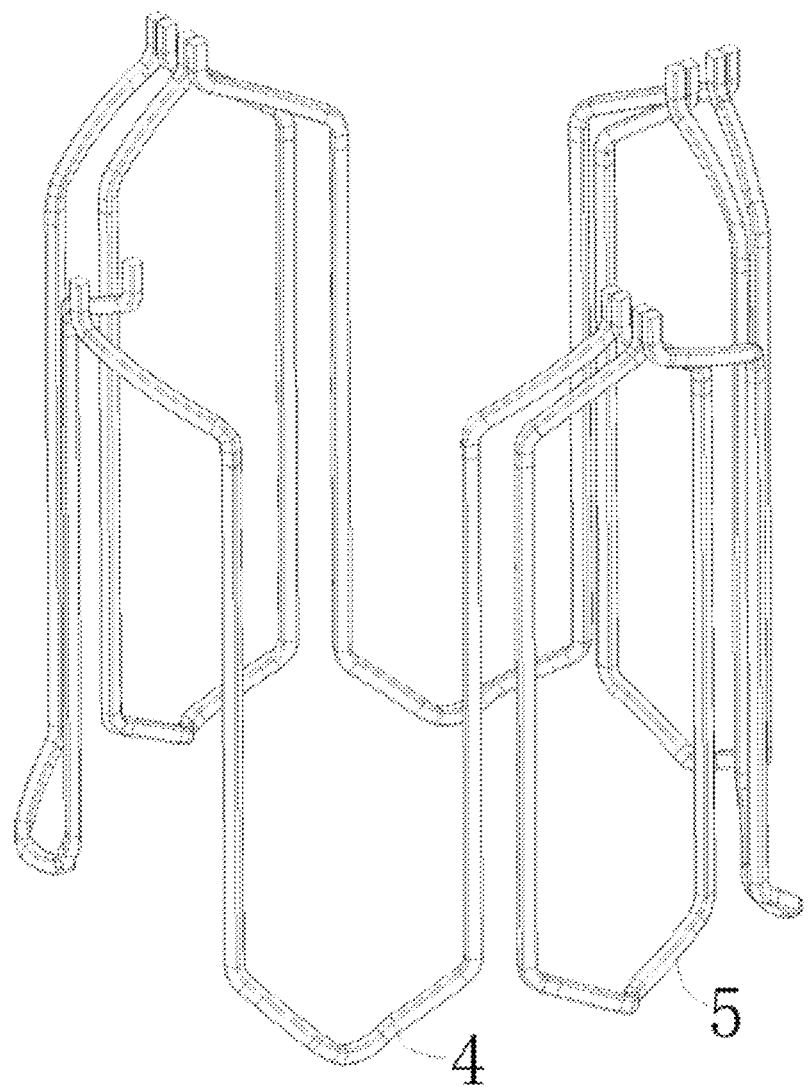

As shown in FIG. 4, in this embodiment, each phase winding includes two branches arranged in parallel, each branch is formed by connecting two coil rings, as shown in FIG. 5 and FIG. 6. Each of the coil rings includes a set of lap winding coils and a set of combined conductors. Each set of lap winding coils includes P lap winding coils evenly distributed in the circumferential direction, and each set of combined conductors includes P combined conductors evenly distributed in the circumferential direction, and P is the number of pole pairs. In this embodiment, the number of pole pairs P is 4.

A same phase winding includes two sets of coil rings, each set of coil rings includes two coil rings located in consecutive adjacent two slots in the circumferential direction of the stator in an assembly state. In this embodiment, the number of slots per pole and phase is Q, Q=2, where a coil ring located in a first slot in a clockwise direction in one set of coil rings is connected in series with a coil ring located in a second slot in the clockwise direction in another set of coil rings to form a branch.

Figure 7:
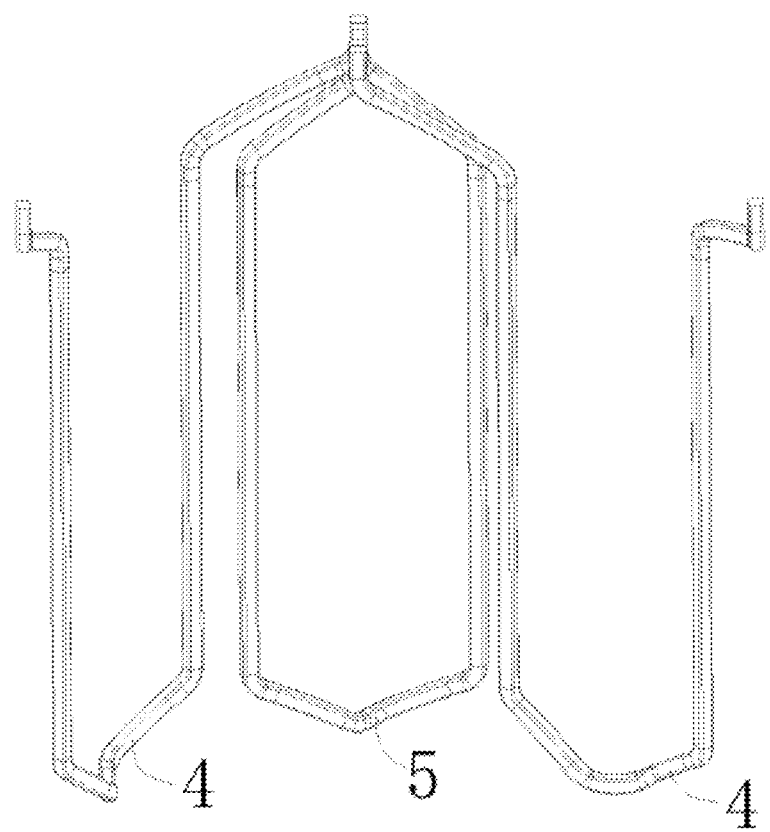
FIG. 7 is a schematic view showing a connection structure between lap winding coils and combined conductors.

In this embodiment, the lap winding coils and the combined conductors on each coil ring are spaced apart in a staggered manner in the circumferential direction and are connected in series sequentially; as shown in FIG. 7, one lap winding coil may be also provided at a position between two circumferentially adjacent combined conductors in one set of combined conductors.

Besides, each of the lap winding coil 4 and the combined conductor 5 includes one hairpin conductor, the hairpin conductor includes a hairpin body which as a whole is bent into a U-shape, the hairpin body includes two support leg parts arranged in parallel and a head part connected to one end of the two support leg parts, and the two support leg parts are each provided with a support foot at another end. Further, the hairpin conductor of the lap winding coil is an integrally annular O-shaped conductor, two support feet of the O-shaped conductor are skewed and bent toward the middle part in a width direction of the hairpin body, and are spaced apart in a staggered manner in a thickness direction of the hairpin body; the hairpin conductor of the combined conductor is a wave-like conductor with two support feet skewed and bent away from each other in the width direction of the hairpin body.

In the clockwise or counterclockwise direction, in the branch located in the Ath slot in the assembly state, in the two coil rings connected in series, a pitch of a last hairpin conductor on the former coil ring is Y+Q−2A+1, a pitch of a last hairpin conductor on the latter coil ring is Y−Q+2A−1, and a pitch of all other hairpin conductors is Y; or, in the clockwise or counterclockwise direction, in the branch located in the Ath slot in the assembly state, in the two coil rings connected in series, a pitch of a first hairpin conductor on the former coil ring is Y+Q−2A+1, a pitch of a first hairpin conductor on the latter coil ring is Y−Q+2A−1, and a pitch of all other hairpin conductors is Y.

In this embodiment, viewed in a direction toward the connection side, in the clockwise direction, in the branch located in the first slot in the assembly state, in the two coil rings connected in series, a pitch of a last hairpin conductor on the former coil ring is Y+1, a pitch of a last hairpin conductor on the latter coil ring is Y−1, and a pitch of all other hairpin conductors is Y; in the branch located in the second slot in the assembly state, in the two coil rings connected in series, a pitch of a last hairpin conductor on the former coil ring is Y−1, a pitch of a last hairpin conductor on the latter coil ring is Y+1, and a pitch of all other hairpin conductors is Y.

In this way, in a same branch, the support foot of the last hairpin conductor on the former coil ring can be located close to the support foot connected therewith of the latter coil ring, so that the two support feet can be directly connected without using a jumper conductor, and the difficulty of assembly and welding is reduced.

As shown in FIG. 5, support leg parts which a pair of support feet for connecting the combined conductors and one end of the lap winding coil are located on, are respectively located on an outermost layer and a secondly-outermost layer of respective slots during assembly. Furthermore, in this embodiment, in each branch, the support feet of the support leg parts located on the outermost layer and the secondly-outermost layer of respective slots in the assembly state are selected to connect the power supply and the star point. As shown in FIG. 1 and FIG. 2, the support foot welded to the star point connecting conductor 7 is located on the secondly-outermost layer, and the support foot welded to the power supply lead-out conductor 6 is located on the outermost layer. In specific implementation, the power supply lead-out conductor 6 may be welded to the support foot on the secondly-outermost layer, and the star point connecting conductor 7 may be welded to the support foot on the outermost layer.

The support feet for connecting the power supply and the star point are arranged on the outermost layer and the secondly-outermost layer, or arranged on the secondly-outermost layer and the outermost layer, the support feet on the outermost layer for connecting the power supply or the star point may be bent outward first, so that the support feet on the corresponding secondly-outermost layer are in the outermost positions, which is convenient for the star point connecting conductor to be directly welded to the support foot for connecting the star point, and reduces the difficulty of welding.

Figure 8:
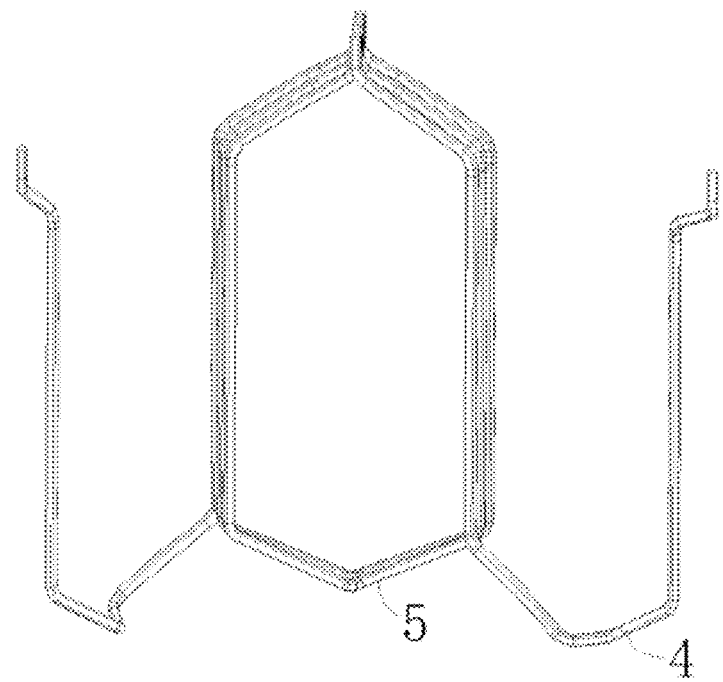
FIG. 8 is a schematic view showing a connection structure between the lap winding coils and the combined conductors in a second embodiment.

The second embodiment differs from the first embodiment in that: as shown in FIG. 8, the lap winding coil includes two hairpin conductors, which are two 0-shaped conductors stacked and connected in series.

Figure 9:
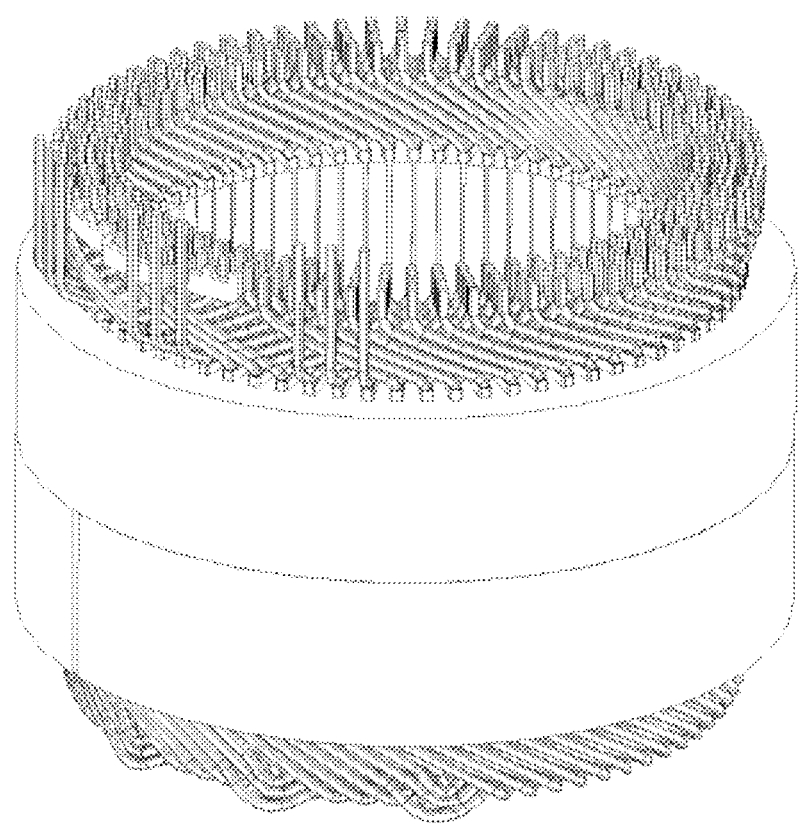
FIG. 9 is a schematic structural view of a stator in a third embodiment.
Figure 10:
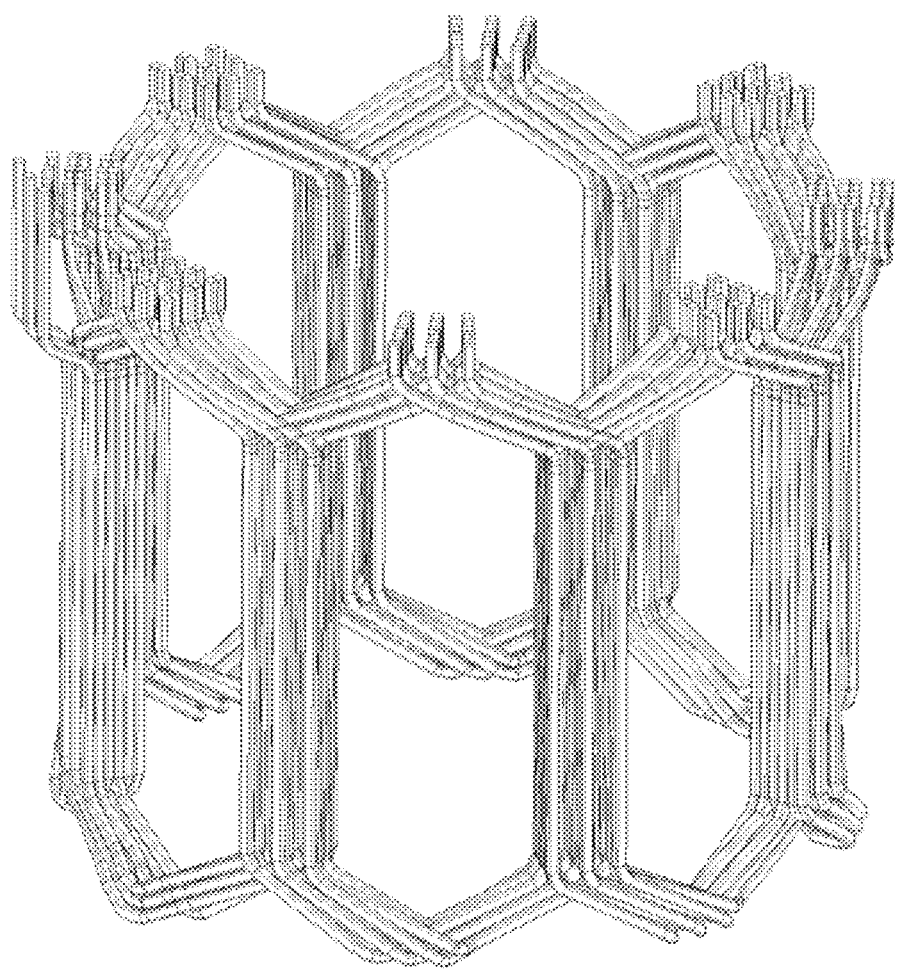
FIG. 10 is a schematic structural view of the one phase winding in the third embodiment.

The third embodiment differs from the first embodiment in that: Q=3, since each branch is formed by connecting two coil rings, and a same phase winding includes two sets of coil rings, each set of coil rings includes three coil rings located in consecutive adjacent three slots in the circumferential direction of the stator in the assembly state. A coil ring located in a first slot in a clockwise direction in one set of coil rings is connected in series with a coil ring located in a third slot in the clockwise direction in another set of coil rings to form a branch; a coil ring located in a second slot in a clockwise direction in one set of coil rings is connected in series with a coil ring located in a second slot in the clockwise direction in another set of coil rings to form a branch; a coil ring located in a third slot in a clockwise direction in one set of coil rings is connected in series with a coil ring located in a first slot in the clockwise direction in another set of coil rings to form a branch; so that the phase winding has three parallel branches, as shown in FIG. 9 and FIG. 10.

Figure 11:
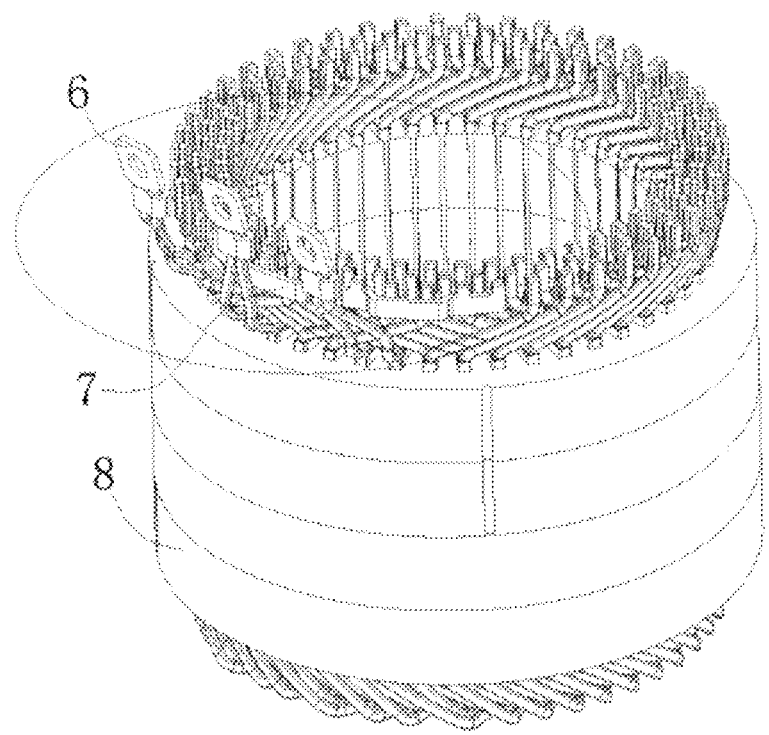
FIG. 11 is a schematic structural view of the stator in a fourth embodiment.
Figure 12:
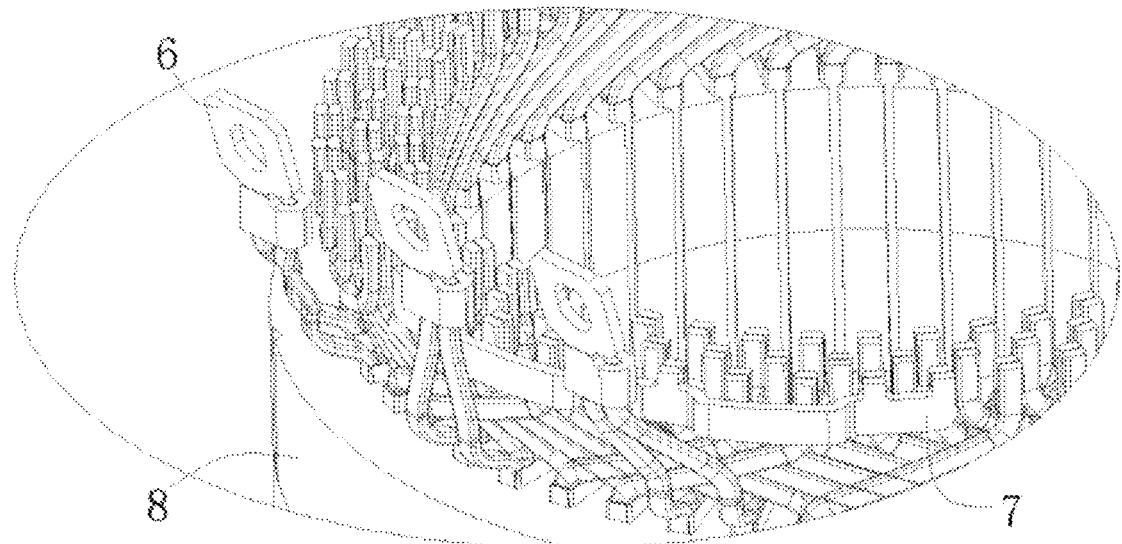
FIG. 12 is an enlarged schematic structural view at a circle in FIG. 11.
Figure 13:
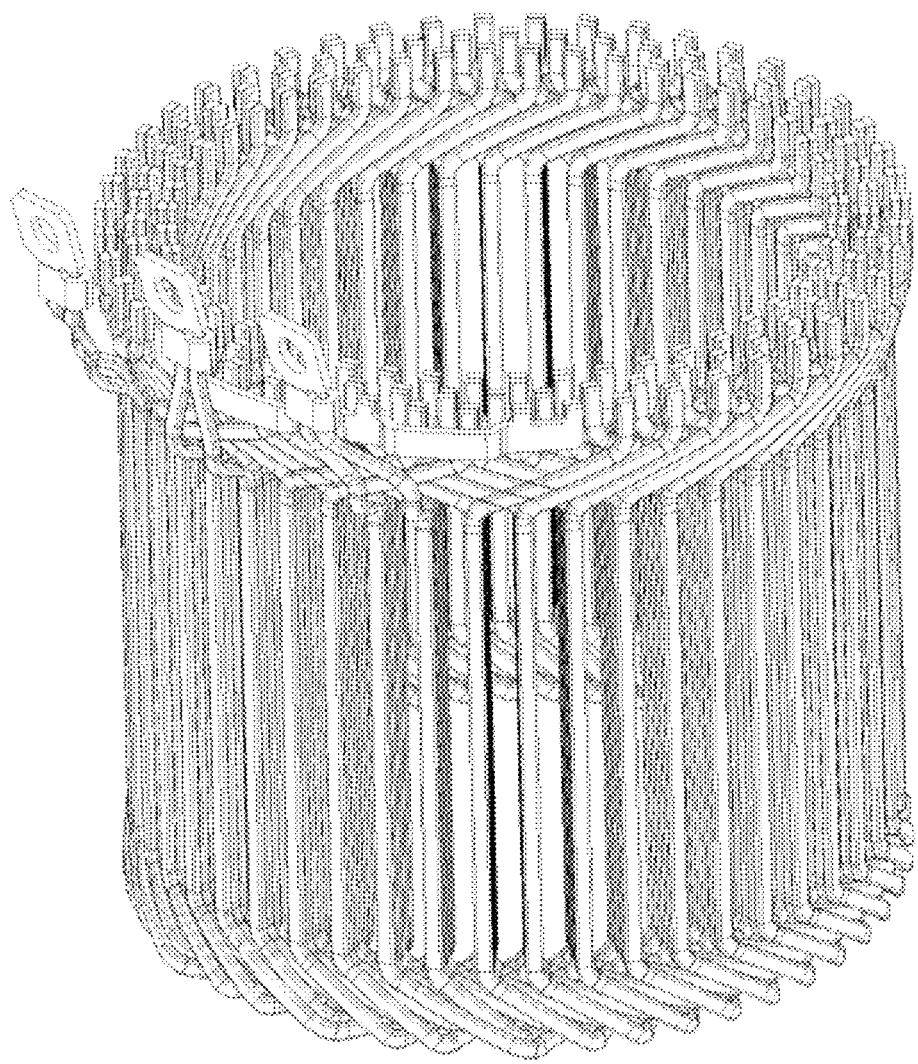
FIG. 13 is a schematic structural view of three phase windings in the fourth embodiment.

In the fourth embodiment, as shown in FIGS. 11 to 13, a motor includes a stator, the stator includes a stator iron core 8 and three circuits of phase windings mounted on the stator iron core 8, one end of each branch on phase windings is connected to each other by a star point connecting conductor 7, and another ends of two parallel branches on each phase winding are connected in parallel by a power supply lead-out conductor 6.

The stator iron core 8 includes an integrally cylindrical main body, multiple stator iron core slots opening radially inward are circumferentially defined in an inner ring of the stator iron core 8, and a lower end of each stator iron core slot is an insertion side (also called a coronal side), and an upper end of each stator iron core slot is a connection side.

Figure 14:
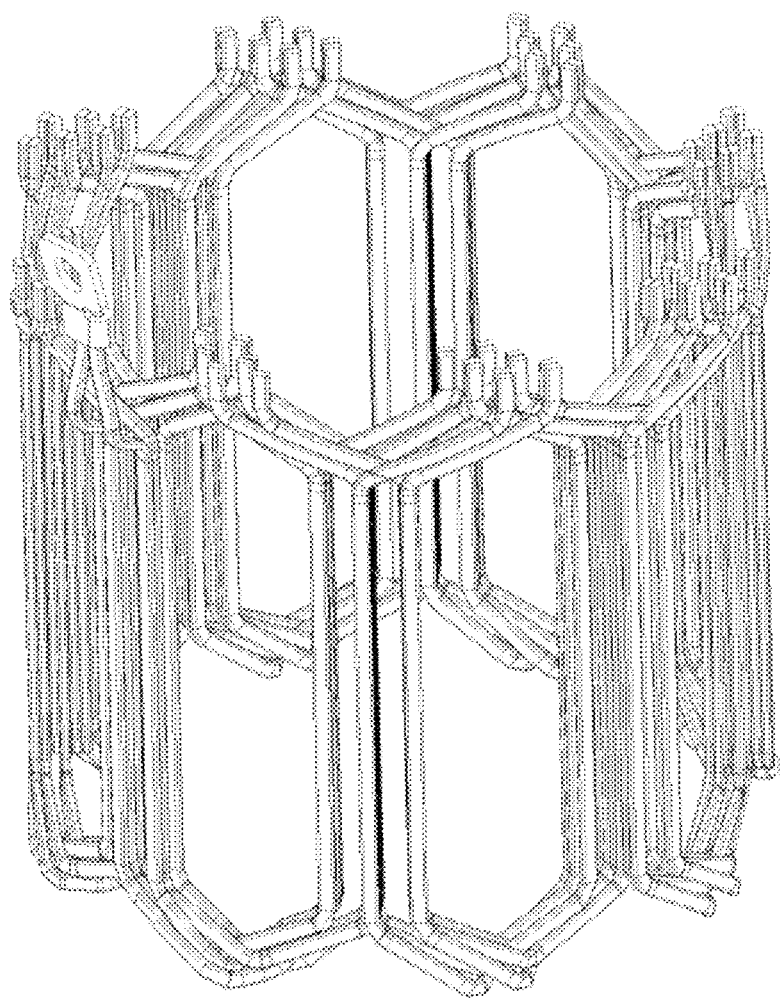
FIG. 14 is a schematic structural view of the one phase winding in the fourth embodiment.
Figure 15:
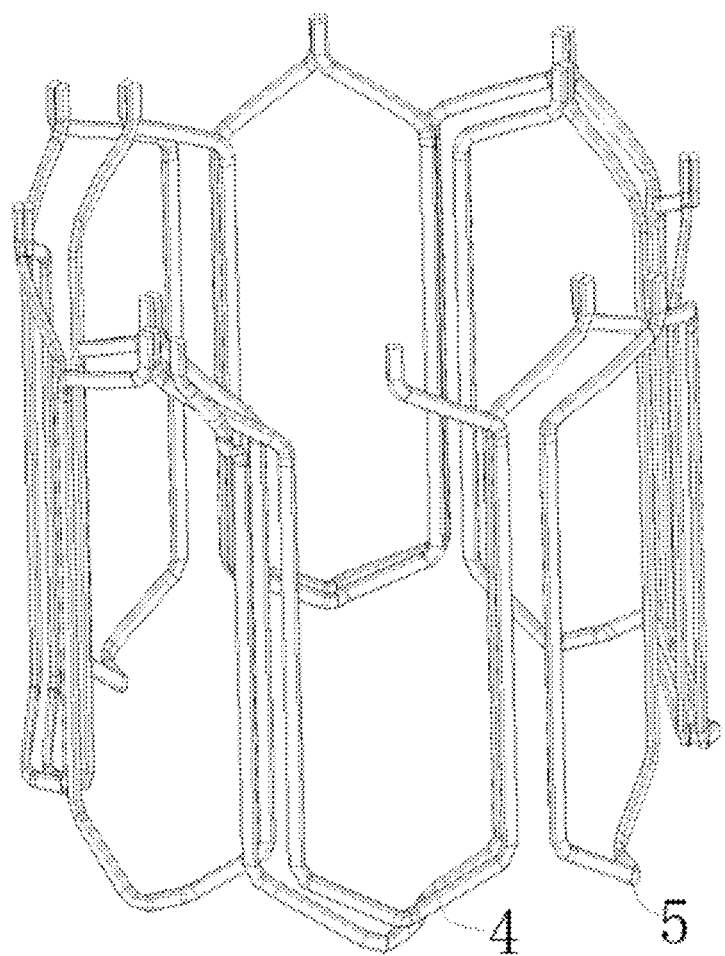
FIG. 15 and FIG. 16 are schematic structural views of coil rings in a branch in the fourth embodiment.
Figure 16:
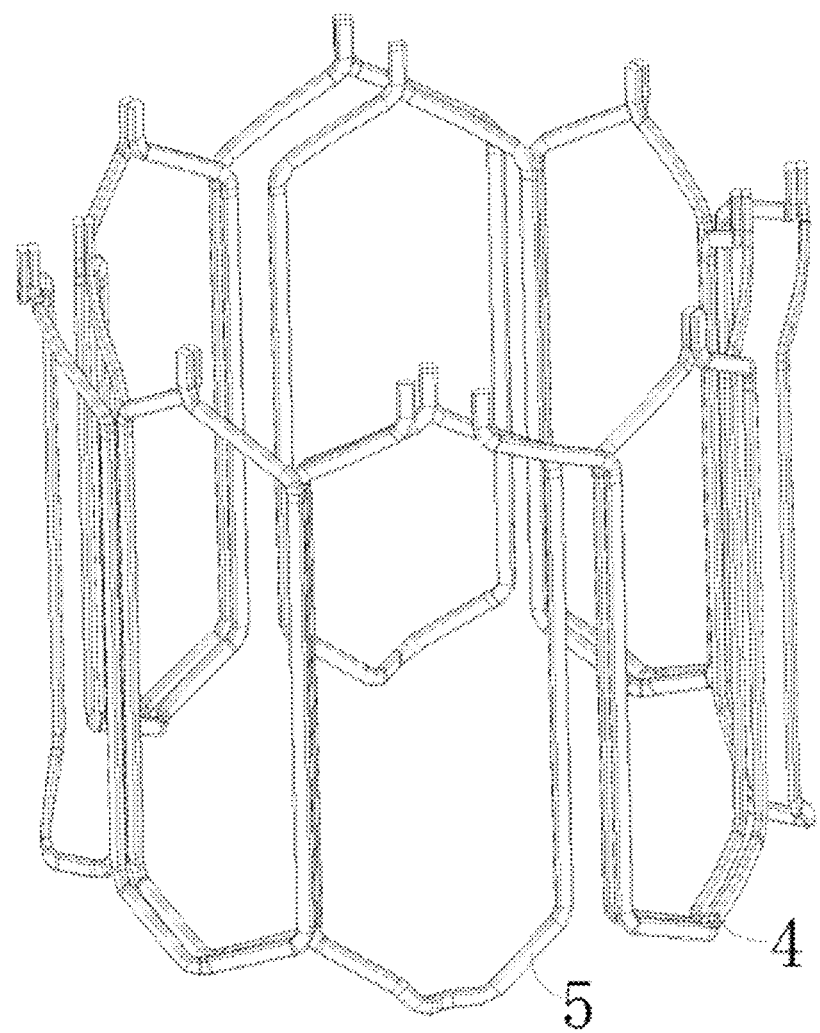

As shown in FIG. 14, in this embodiment, each phase winding includes two branches arranged in parallel, each branch is formed by connecting two coil rings, as shown in FIG. 15 and FIG. 16. Each of the coil rings includes a set of lap winding coils and a set of combined conductors. Each set of lap winding coils includes P lap winding coils evenly distributed in the circumferential direction, and each set of combined conductors includes P combined conductors evenly distributed in the circumferential direction, and P is the number of pole pairs. In this embodiment, the number of pole pairs P is 4.

A same phase winding includes two sets of coil rings, each set of coil rings includes two coil rings located in consecutive adjacent two slots in the circumferential direction of the stator in an assembly state. In this embodiment, the number of slots per pole and phase is Q, Q=2, where a coil ring located in a first slot in a clockwise direction in one set of coil rings is connected in series with a coil ring located in a second slot in the clockwise direction in another set of coil rings to form a branch.

Figure 17:
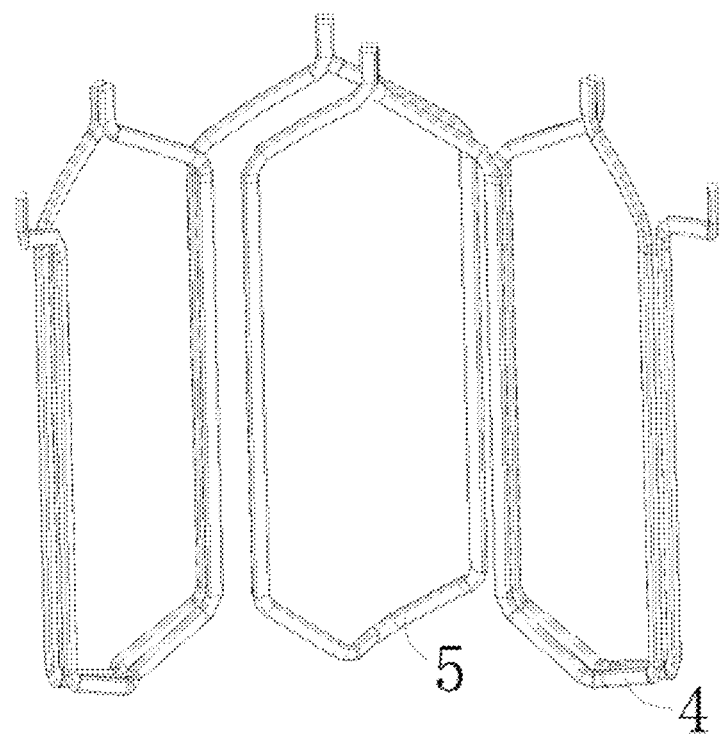
FIG. 17 is a schematic view showing a connection structure between the lap winding coils and the combined conductors.

In this embodiment, the lap winding coils and the combined conductors on each coil ring are spaced apart in a staggered manner in the circumferential direction and are connected in series sequentially. As shown in FIG. 17, one lap winding coil may be also provided at a position between two circumferentially adjacent combined conductors in one set of combined conductors.

Besides, the lap winding coil 4 includes two hairpin conductors, the combined conductor 5 includes one hairpin conductor, the hairpin conductor includes a hairpin body which as a whole is bent into a U-shape, the hairpin body includes two support leg parts arranged in parallel and a head part connected to one end of the two support leg parts, and the two support leg parts are each provided with a support foot at another end.

In this embodiment, the two hairpin conductors of the lap winding coil are first-type skewed U-shaped conductor and second-type skewed U-shaped conductor, respectively. The first-type skewed U-shaped conductor and the second-type skewed U-shaped conductor are arranged side by side in a thickness direction of the hairpin body, a support foot on one support leg part of the first-type skewed U-shaped conductor and a support foot on another support leg part of the second-type skewed U-shaped conductor are skewed and bent away from each other in the width direction of the hairpin body, and another two support feet of the first-type skewed U-shaped conductor and the second-type skewed U-shaped conductor are bent toward each other in the width direction of the hairpin body and are connected with each other to form the lap winding coil.

In this embodiment, the hairpin conductor of the combined conductor 5 is an integrally annular O-shaped conductor, two support feet of the O-shaped conductor are skewed and bent toward a middle part in the width direction of the hairpin body, and are spaced apart in a staggered manner in the thickness direction of the hairpin body.

In the clockwise or counterclockwise direction, in the branch located in the Ath slot in the assembly state, in the two coil rings connected in series, a pitch of a last hairpin conductor on the former coil ring is Y+Q−2A+1, a pitch of a last hairpin conductor on the latter coil ring is Y−Q+2A−1, and a pitch of all other hairpin conductors is Y; or, in the clockwise or counterclockwise direction, in the branch located in the Ath slot in the assembly state, in the two coil rings connected in series, a pitch of a first hairpin conductor on the former coil ring is Y+Q−2A+1, a pitch of a first hairpin conductor on the latter coil ring is Y−Q+2A−1, and a pitch of all other hairpin conductors is Y.

In this embodiment, viewed in a direction toward the connection side, in the clockwise direction, in the branch located in the first slot in the assembly state, in the two coil rings connected in series, a pitch of a last hairpin conductor on the former coil ring is Y+1, a pitch of a last hairpin conductor on the latter coil ring is Y−1, and a pitch of all other hairpin conductors is Y; In the branch located in the second slot in the assembly state, in the two coil rings connected in series, a pitch of a last hairpin conductor on the former coil ring is Y−1, a pitch of a last hairpin conductor on the latter coil ring is Y+1, and a pitch of all other hairpin conductors is Y.

In this way, in a same branch, the support foot of the last hairpin conductor on the former coil ring can be located close to the support foot connected therewith of the latter coil ring, so that the two support feet can be directly connected without using a jumper conductor, and the difficulty of assembly and welding is reduced.

As shown in FIG. 15, support leg parts which a pair of support feet for connecting the combined conductors and one end of the lap winding coil are located on, are respectively located on an outermost layer and a secondly-outermost layer of respective slots during assembly. Furthermore, in this embodiment, in each branch, the support feet of the support leg parts located on the outermost layer and the secondly-outermost layer of respective slots in the assembly state are selected to connect the power supply and the star point. As shown in FIG. 11 and FIG. 12, the support foot welded to the star point connecting conductor 7 is located on the secondly-outermost layer, and the support foot welded to the power supply lead-out conductor 6 is located on the outermost layer. In specific implementation, the power supply lead-out conductor 6 may be welded to the support foot on the secondly-outermost layer, and the star point connecting conductor 7 may be welded to the support foot on the outermost layer.

The support feet for connecting the power supply and the star point are arranged on the outermost layer and the secondly-outermost layer, or arranged on the secondly-outermost layer and the outermost layer, the support feet on the outermost layer for connecting the power supply or the star point may be bent outward first, so that the support feet on the corresponding secondly-outermost layer are in the outermost positions, which is convenient for the star point connecting conductor to be directly welded to the support foot for connecting the star point, and reduces the difficulty of welding.

Figure 18:
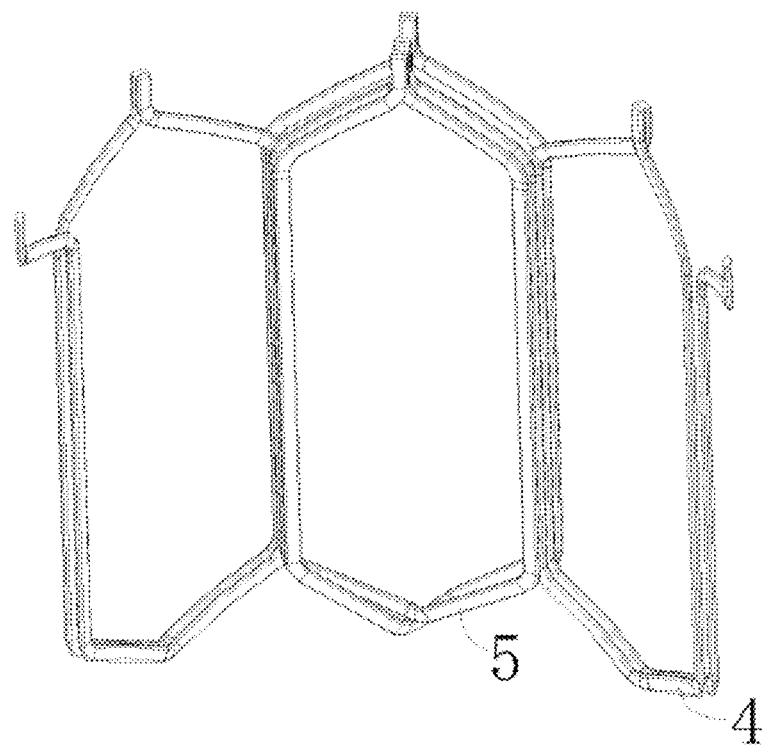
FIG. 18 is a schematic structural view of a fifth embodiment.

The fifth embodiment differs from the fourth embodiment in that: as shown in FIG. 18, the lap winding coil includes two hairpin conductors, which are two 0-shaped conductors stacked and connected in series.

Figure 19:
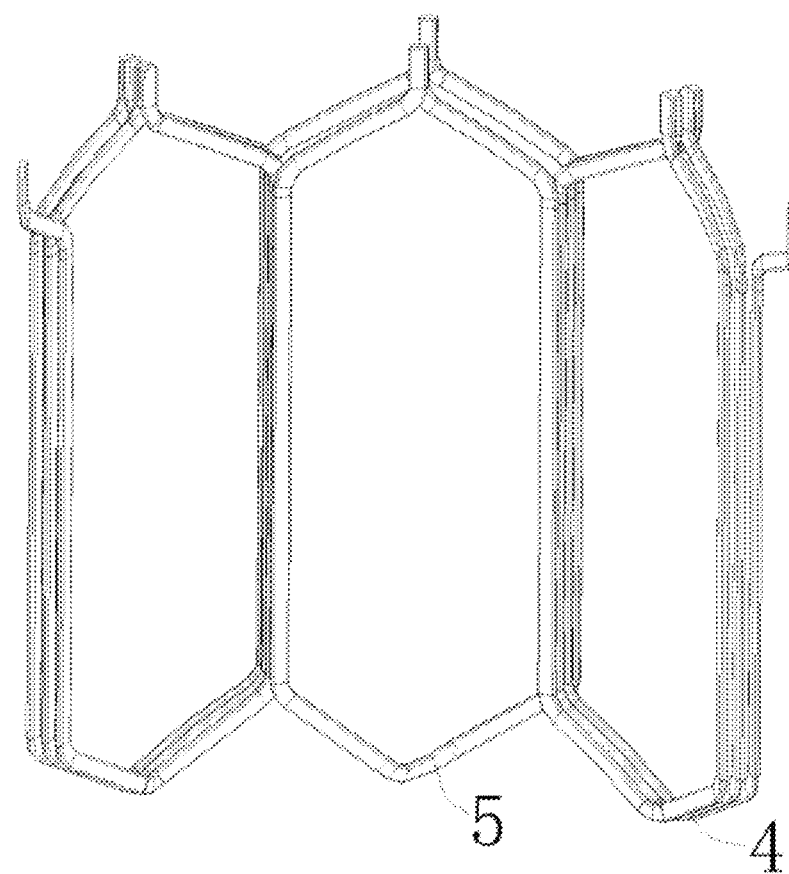
FIG. 19 is a schematic structural view of a sixth embodiment.

The sixth embodiment differs from the fifth embodiment in that: as shown in FIG. 19, the lap winding coil may further include the O-shaped conductor, the O-shaped conductor and the second-type skewed U-shaped conductor are stacked in a thickness direction of the first-type skewed U-shaped conductor, and two support feet of the O-shaped conductor are respectively connected to other adjacent support feet in the thickness direction.

The seventh embodiment differs from the first and fourth embodiments in that: the coil rings on two branches are sequentially connected to form a branch. Specifically, the branch includes two sets of coil rings connected in series, each set of coil rings includes Q coil rings located in consecutive adjacent Q slots in the circumferential direction of the stator in the assembly state, and Q is the number of slots per pole and phase and is an integer greater than 1; in a same set of coil rings, two coil rings located in adjacent slots are connected to each other, and a pitch of the hairpin conductor on a last single coil of a former coil ring in a clockwise or counterclockwise direction is Y+1, the support foot, located at an end of the hairpin conductor with the pitch of Y+1, and the support foot connected therewith of a latter coil ring are arranged side by side in a radial direction of the phase winding, and a pitch of the hairpin conductor on a last single coil of a last coil ring in the clockwise or counterclockwise direction is Y−Q+1, and a pitch of all other hairpin conductors is Y.

For the phase winding with Q=2, in a same set of coil rings, two coil rings located in adjacent slots are connected to each other, and a pitch of the hairpin conductor on a last single coil of a former coil ring in a clockwise or counterclockwise direction is Y+1, the support foot, located at an end of the hairpin conductor with the pitch of Y+1, and the support foot connected therewith of a latter coil ring are arranged side by side in a radial direction of the phase winding, and a pitch of the hairpin conductor on a last single coil of a last coil ring in the clockwise or counterclockwise direction is Y−1, and a pitch of all other hairpin conductors is Y.

Since the support foot, located at an end of the hairpin conductor with the pitch of Y+1, and the support foot connected therewith on a latter coil ring are arranged side by side in a radial direction of the phase winding, the two support feet can be directly welded and connected in series without using additional jumper conductor, which is easier to manufacture.

The above only shows preferred embodiments of the present application, and is not intended to limit the present application. Any modifications, equivalent substitutions, improvements made within the spirit and principle of the present application should be included in the scope of protection of the present application.

The invention claimed is:

1. A mixed-phase winding, comprising at least one branch,
   wherein each branch comprises at least one coil ring, the coil ring comprises a set of lap winding coils and a set of combined conductors, each set of lap winding coils comprises P lap winding coils evenly distributed in a circumferential direction, and each set of combined conductors comprises P combined conductors evenly distributed in the circumferential direction, P is the number of pole pairs, and the lap winding coils and the combined conductors are spaced apart in a staggered manner in the circumferential direction and are connected in series sequentially;
   each of the lap winding coil and the combined conductor comprises one hairpin conductor or at least two hairpin conductors arranged side by side in a thickness direction, the hairpin conductor comprises a hairpin body which as a whole is bent into a U-shape, the hairpin body comprises two support leg parts arranged in parallel and a head part connected to one end of the two support leg parts, and the two support leg parts are each provided with a support foot at another end;
   wherein the lap winding coil comprises two hairpin conductors, which respectively are first-type skewed U-shaped conductor and second-type skewed U-shaped conductor, respectively; the first-type skewed U-shaped conductor and the second-type skewed U-shaped conductor are arranged side by side in a thickness direction of the hairpin body, a support foot on one support leg part of the first-type skewed U-shaped conductor and a support foot on another support leg part of the second-type skewed U-shaped conductor are skewed and bent away from each other in the width direction of the hairpin body, and another two support feet of the first-type skewed U-shaped conductor and the second-type skewed U-shaped conductor are bent toward each other in the width direction of the hairpin body and are connected with each other to form the lap winding coil; the hairpin conductor of the combined conductor is an integrally annular O-shaped conductor, two support feet of the O-shaped conductor are skewed and bent toward a middle part in the width direction of the hairpin body, and are spaced apart in a staggered manner in the thickness direction of the hairpin body.

2. The mixed-phase winding according to claim 1, wherein in each branch, the support leg parts, where support feet for connecting a power supply lead-out conductor and a star point are located, are respectively located on an outermost layer and a secondly-outermost layer, or respectively located on the secondly-outermost layer and the outermost layer of respective slots, where the support leg parts are located, in an assembly state.

3. The mixed-phase winding according to claim 1, wherein each branch is formed by connecting two coil rings, one phase winding comprises two sets of coil rings, each set of coil rings comprises Q coil rings located in consecutive adjacent Q slots in the circumferential direction of the stator in an assembly state, and Q is the number of slots per pole and phase and is an integer greater than 1; in a clockwise or counterclockwise direction, a coil ring located in an Ath slot in one set of coil rings is connected in series with another coil ring located in a (Q+1−A) th slot in another set of coil rings to form a branch.

4. The mixed-phase winding according to claim 1, comprising one branch, wherein the branch comprises two sets of coil rings connected in series, each set of coil rings comprises Q coil rings located in consecutive adjacent Q slots in the circumferential direction of the stator in an assembly state, and Q is the number of slots per pole and phase and is an integer greater than 1; in a same set of coil rings, two coil rings located in adjacent slots are connected to each other, and a pitch of the hairpin conductor on a last single coil of a former coil ring in a clockwise or counterclockwise direction is Y+1, the support foot, located at an end of the hairpin conductor with the pitch of Y+1, and the support foot connected therewith of a latter coil ring are arranged side by side in a radial direction of the phase winding, and a pitch of the hairpin conductor on a last single coil of a last coil ring in the clockwise or counterclockwise direction is Y−Q+1, and a pitch of all other hairpin conductors is Y.

5. The mixed-phase winding according to claim 3, wherein in the clockwise or counterclockwise direction, in the branch located in the Ath slot in the assembly state, in the two coil rings connected in series, a pitch of a last hairpin conductor on a former coil ring is Y+Q−2A+1, a pitch of a last hairpin conductor on a latter coil ring is Y−Q+2A−1, and a pitch of all other hairpin conductors is Y; or, in the clockwise or counterclockwise direction, in the branch located in the Ath slot in the assembly state, in the two coil rings connected in series, a pitch of a first hairpin conductor on the former coil ring is Y+Q−2A+1, a pitch of a first hairpin conductor on the latter coil ring is Y−Q+2A−1, and a pitch of all other hairpin conductors is Y.

6. The mixed-phase winding according to claim 1, wherein the lap winding coil further comprises the O-shaped conductor, the O-shaped conductor and the second-type skewed U-shaped conductor are stacked in a thickness direction of the first-type skewed U-shaped conductor, and two support feet of the O-shaped conductor are respectively connected to other adjacent support feet in the thickness direction.

7. The mixed-phase winding according to claim 1, wherein the hairpin conductor of the lap winding coil is an integrally annular O-shaped conductor, two support feet of the O-shaped conductor are skewed and bent toward the middle part in a width direction of the hairpin body, and are spaced apart in a staggered manner in a thickness direction of the hairpin body; the combined conductor comprises one hairpin conductor, which is a wave-like conductor with two support feet skewed and bent away from each other in the width direction of the hairpin body.

8. The mixed-phase winding according to claim 1, wherein support leg parts, where a pair of support feet connected to each other between the lap winding coil and the combined conductors are located, are respectively located in a secondly-outermost layer and an outermost layer, or located in the outermost layer and the secondly-outermost layer of respective slots, where the support leg parts are located, during assembly.

9. The mixed-phase winding according to claim 1, wherein at least one hairpin conductor in the branch is two single foot conductors correspondingly arranged at a position where the support leg parts of the hairpin conductor is located, one end of the single foot conductor is a support foot, and the support foot is consistent with the support foot of the hairpin conductor at a corresponding position, and another end of the single foot conductor is a connecting end.

10. A stator, comprising a stator iron core and a plurality of circuits of the mixed-phase windings according to claim 1 mounted on the stator iron core, wherein connecting ends of the plurality of circuits of the mixed-phase windings for connecting a power supply lead-out conductor are respectively connected with power supply lead-out conductor terminals, and connecting ends of the plurality of circuits of the mixed-phase windings for connecting a star point are welded by a star point connecting conductor.

11. A motor, comprising the stator according to claim 10.

* * * * *